(12) United States Patent
De'Longhi

(10) Patent No.: US 8,408,117 B2
(45) Date of Patent: Apr. 2, 2013

(54) COFFEE MACHINE INFUSION GROUP

(75) Inventor: Giuseppe De'Longhi, Treviso (IT)

(73) Assignee: De' Longhi S.p.A., Treviso (IT)

( * ) Notice: Subject to any disclaimer, the term of this patent is extended or adjusted under 35 U.S.C. 154(b) by 586 days.

(21) Appl. No.: 12/669,743

(22) PCT Filed: Jul. 16, 2008

(86) PCT No.: PCT/EP2008/005794
§ 371 (c)(1),
(2), (4) Date: Jan. 19, 2010

(87) PCT Pub. No.: WO2009/010276
PCT Pub. Date: Jan. 22, 2009

(65) Prior Publication Data
US 2010/0186598 A1    Jul. 29, 2010

(30) Foreign Application Priority Data

Jul. 18, 2007   (IT) .............................. MI2007A1441

(51) Int. Cl.
*A47J 31/34* (2006.01)
(52) U.S. Cl. ..................................... 99/289 R; 99/302 P
(58) Field of Classification Search ................ 99/289 R, 99/302 P, 302 R
See application file for complete search history.

(56) References Cited

U.S. PATENT DOCUMENTS

| 5,259,296 | A | 11/1993 | Mikael | |
| 7,024,985 | B2* | 4/2006 | Park | 99/302 P |
| 7,487,713 | B2* | 2/2009 | Magno | 99/302 P |
| 7,571,674 | B2* | 8/2009 | Wang | 99/302 P |
| 8,210,098 | B2* | 7/2012 | Boussemart et al. | 99/302 P |
| 2003/0209150 | A1 | 11/2003 | Vidondo | |
| 2005/0139080 | A1* | 6/2005 | De'Longhi | 99/275 |

FOREIGN PATENT DOCUMENTS

| EP | 0486433 | 5/1992 |
| EP | 0559620 | 9/1993 |
| EP | 1360919 | 11/2003 |

* cited by examiner

*Primary Examiner* — Reginald L Alexander
(74) *Attorney, Agent, or Firm* — Volpe and Koenig, P.C.

(57) ABSTRACT

The coffee machine infusion group comprises a closure piston and an infusion cylinder subjectable to a reversible movement between a position of engagement with the closure piston for the creation of an infusion chamber and a position of disengagement from the closure piston for the loading of a coffee powder load, the infusion group having an expulsion system of the spent coffee powder load from the infusion cylinder, the expulsion system comprising an expulsion piston displaceably housed in the infusion cylinder, the expulsion system further comprising a speed multiplier mechanism operatively connecting the infusion cylinder and the expulsion piston for their relative displacement between a receiving position of the coffee powder load into the infusion cylinder and an expelling position of the coffee powder load from the infusion cylinder.

12 Claims, 18 Drawing Sheets

COFFEE MACHINE INFUSION GROUP

CROSS REFERENCE TO RELATED APPLICATIONS

This application is a U.S. national phase application of International Application No. PCT/EP2008/005794, filed Jul. 16, 2008, which claims benefit from Italian Application No. MI2007A001441, filed Jul. 18, 2007, both of which are hereby incorporated herein by reference in their entirety.

FIELD OF THE INVENTION

The present invention relates to an infusion group for a machine for producing a coffee drink.

BACKGROUND

The traditional automatic or semi-automatic coffee machines comprise an infusion group having an infusion cylinder reversibly movable from a disengagement position to an engagement position with a closure piston for the creation of an infusion chamber into which the infusion water is conveyed which has been heated by a boiler, and conveyed through a suitable inner channelling to the closure piston.

The infusion cylinder instead has at its interior an expulsion piston which is moved in a coordinated manner with a scraper for the discharge of the load of spent coffee powder.

A functioning cycle in general comprises a step of loading the coffee powder load inside the infusion cylinder, a step of outgoing movement of the infusion cylinder towards the engagement position with the closure piston for the creation of the infusion chamber and the achievement of the infusion, and a step of return movement of the infusion cylinder which is disengaged from the closure piston for expelling the load of spent coffee powder and loading the new coffee powder load.

Such coffee machines can lament an excessive bulk due to the particular placement and structure of the infusion group and mechanisms with which it is equipped.

The increasingly heard market need to have the infusion cylinder dismountable, to be removed mainly for its cleaning and/or maintenance, has in general led to an increased structural complication of the infusion group.

SUMMARY

The technical task which the present invention proposes is therefore that of making an infusion group for a machine for producing a coffee drink which permits eliminating the lamented technical drawbacks of the prior art.

In the scope of this technical task, one object of the invention is that of making a highly efficient and reliable infusion group for a coffee machine, easily accessible, compact, constructively and structurally simple.

The technical task, as well as these and other objects according to the present invention are achieved by making a infusion group for coffee machine in accordance with the appended claims.

BRIEF DESCRIPTION OF THE DRAWINGS

Further characteristics and advantages of the invention will be clearer from the description of one or more preferred but not exclusive embodiments of the infusion group for coffee machine according to the finding, illustrated as indicative and non-limiting in the attached drawings, in which.

DETAILED DESCRIPTION OF THE PREFERRED EMBODIMENTS

Figure 1:
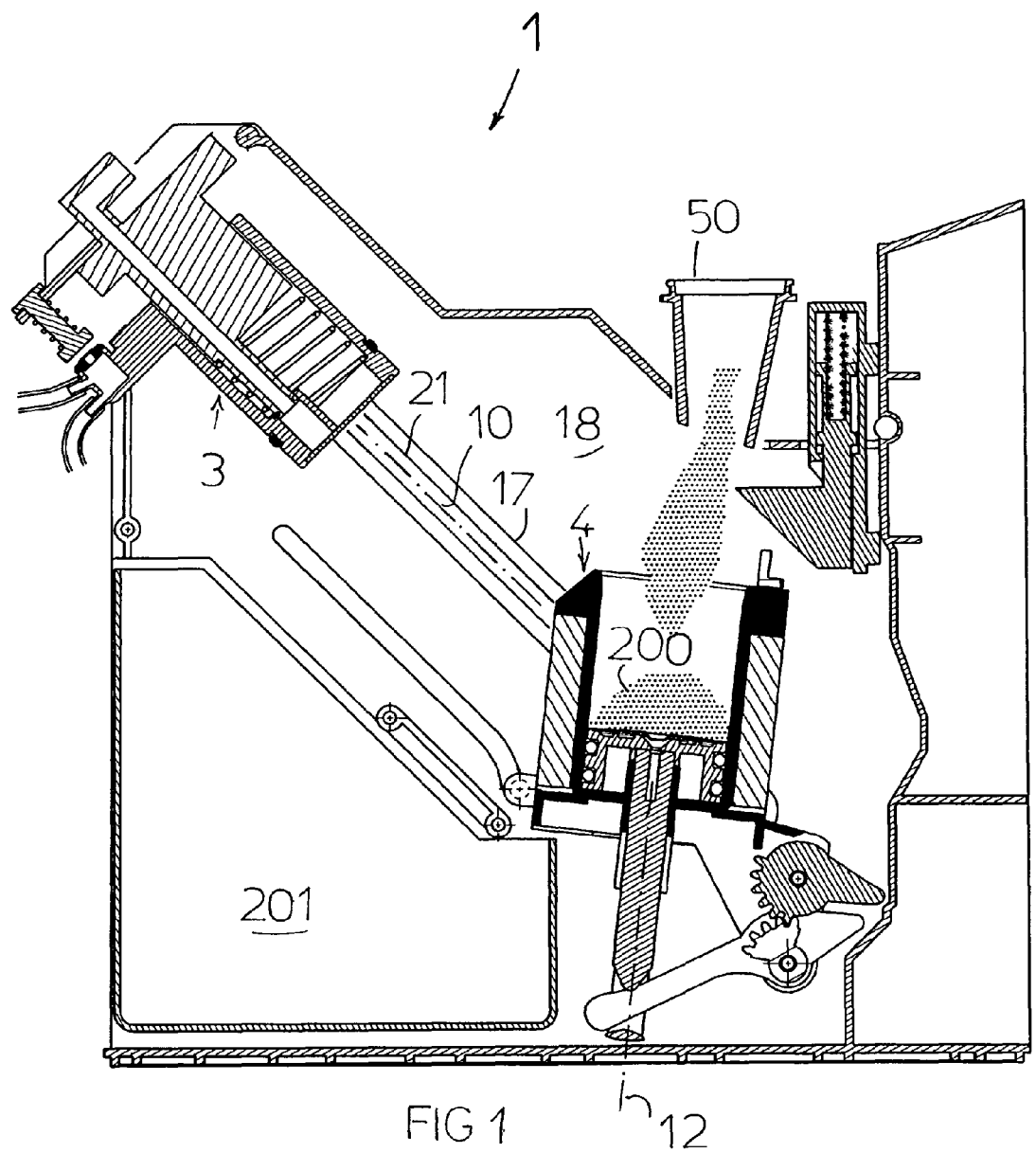
FIGS. 1-9 show a side elevation view of a section in a central vertical plane of a coffee machine having in infusion group according to a preferred embodiment of the present invention, wherein the infusion cylinder is shown in the operative positions which progressively follow each other in an entire functioning cycle.
Figure 2:
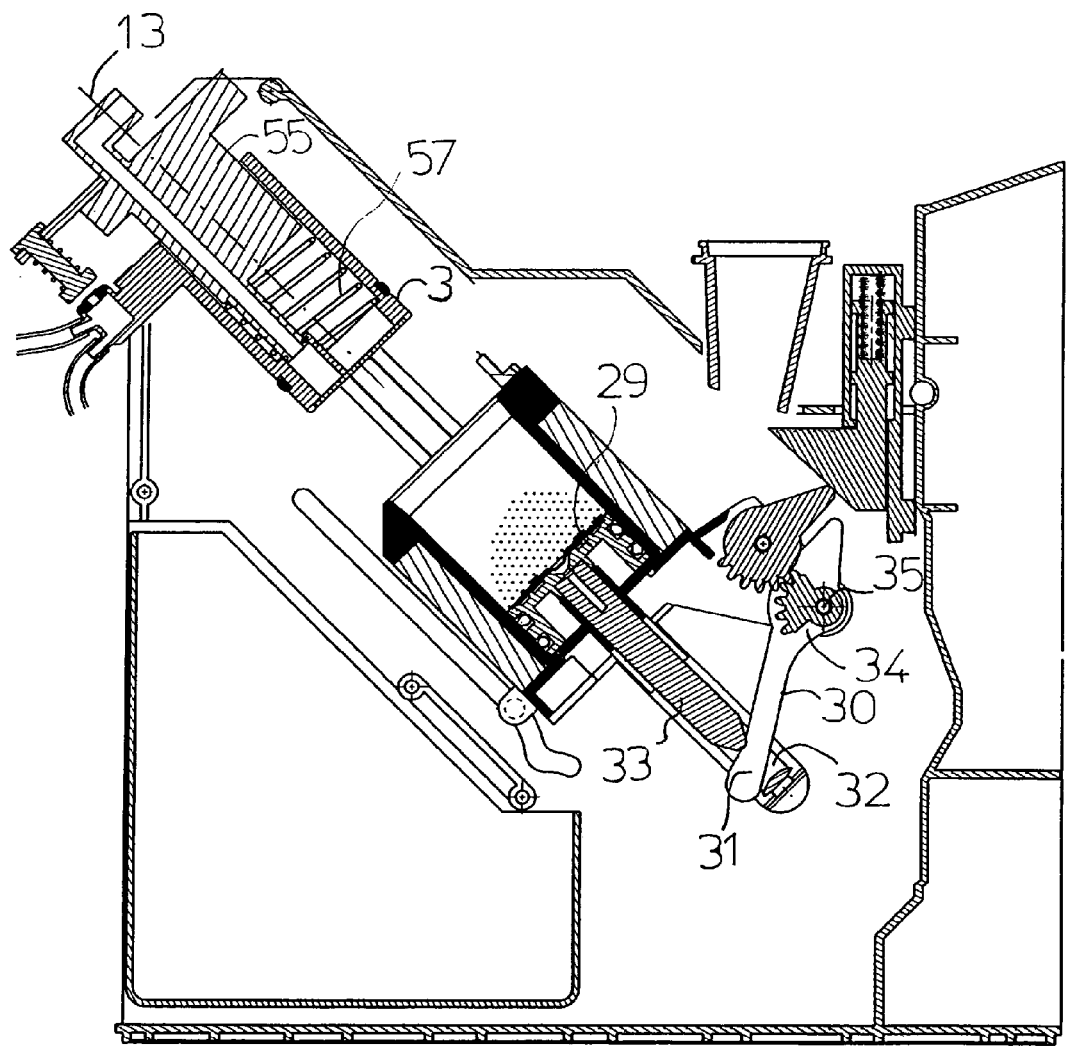
Figure 3:
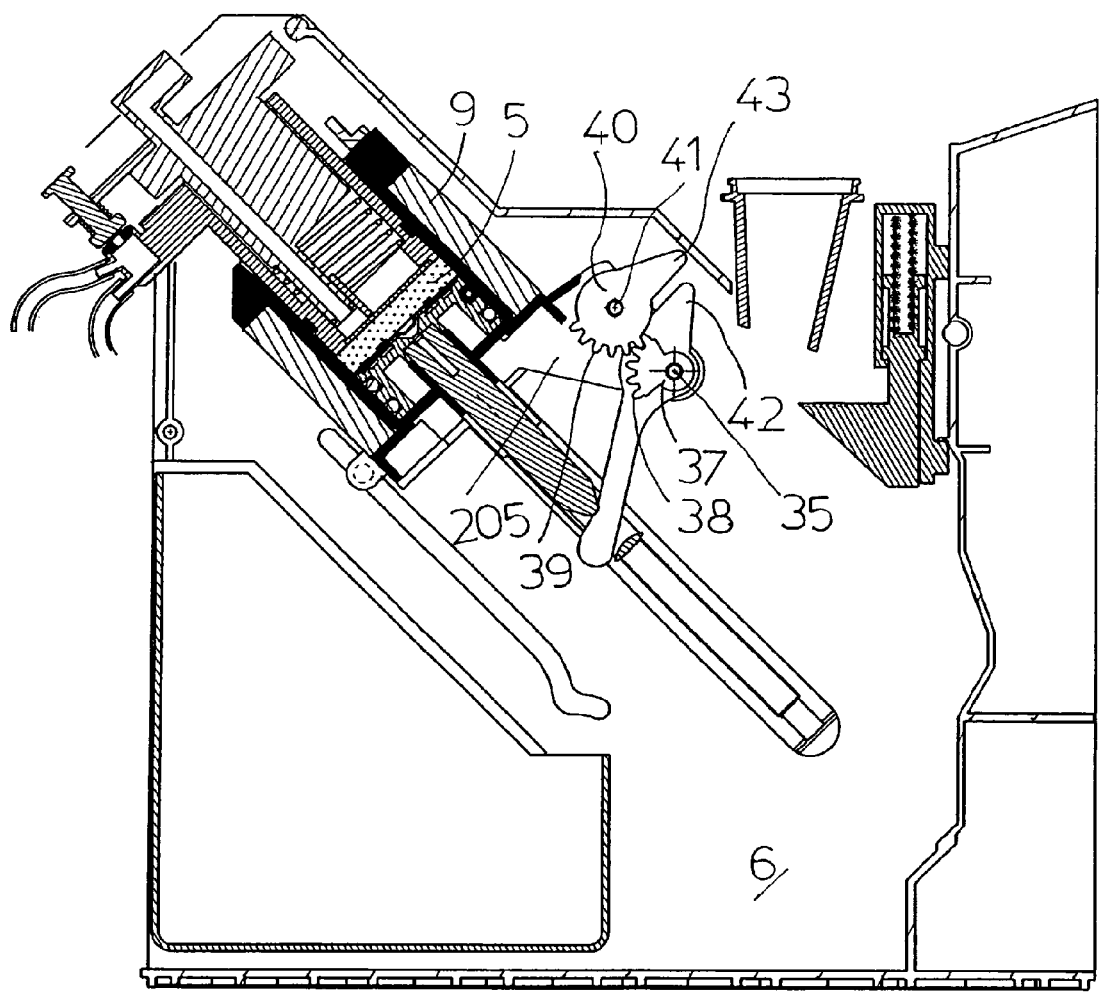
Figure 4:
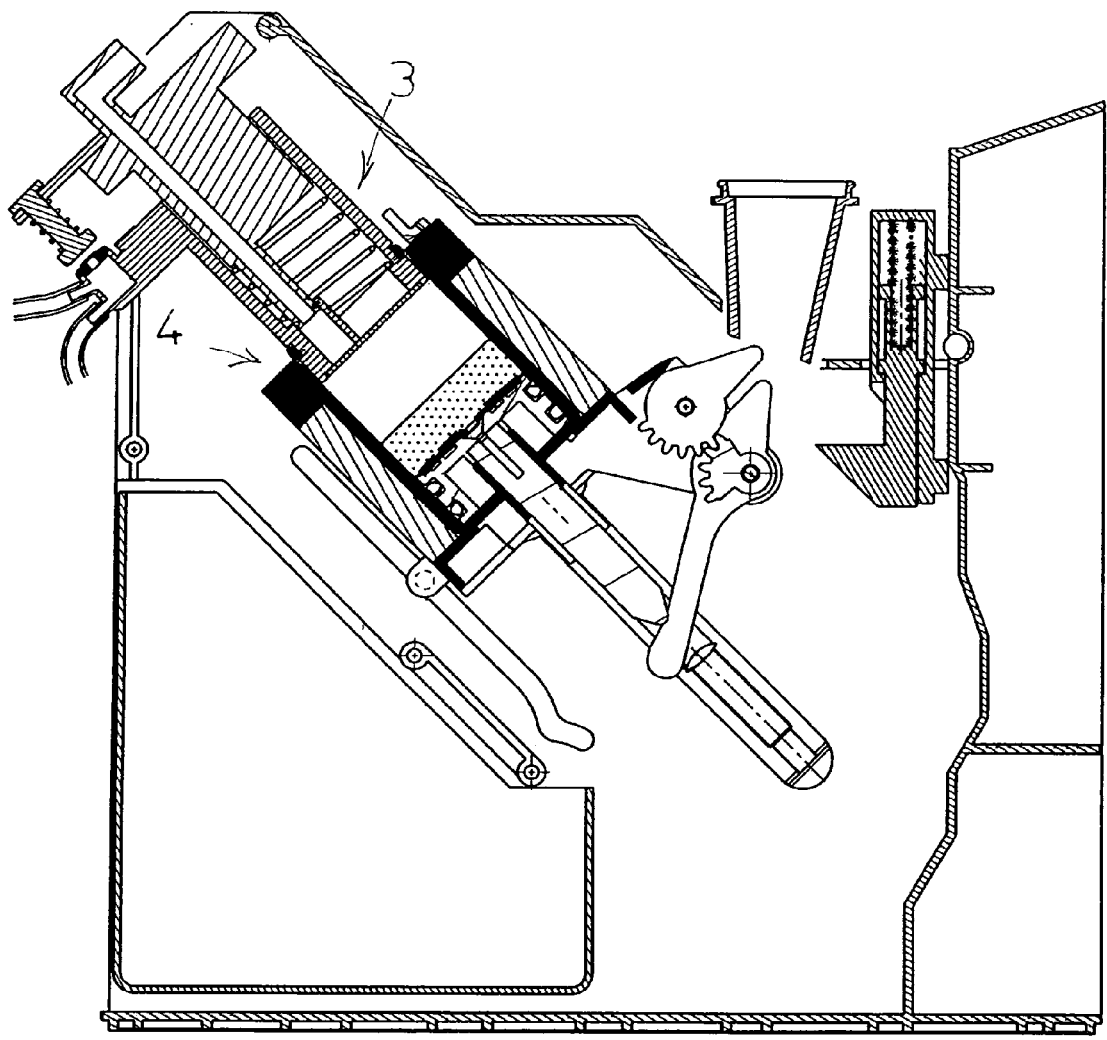
Figure 5:
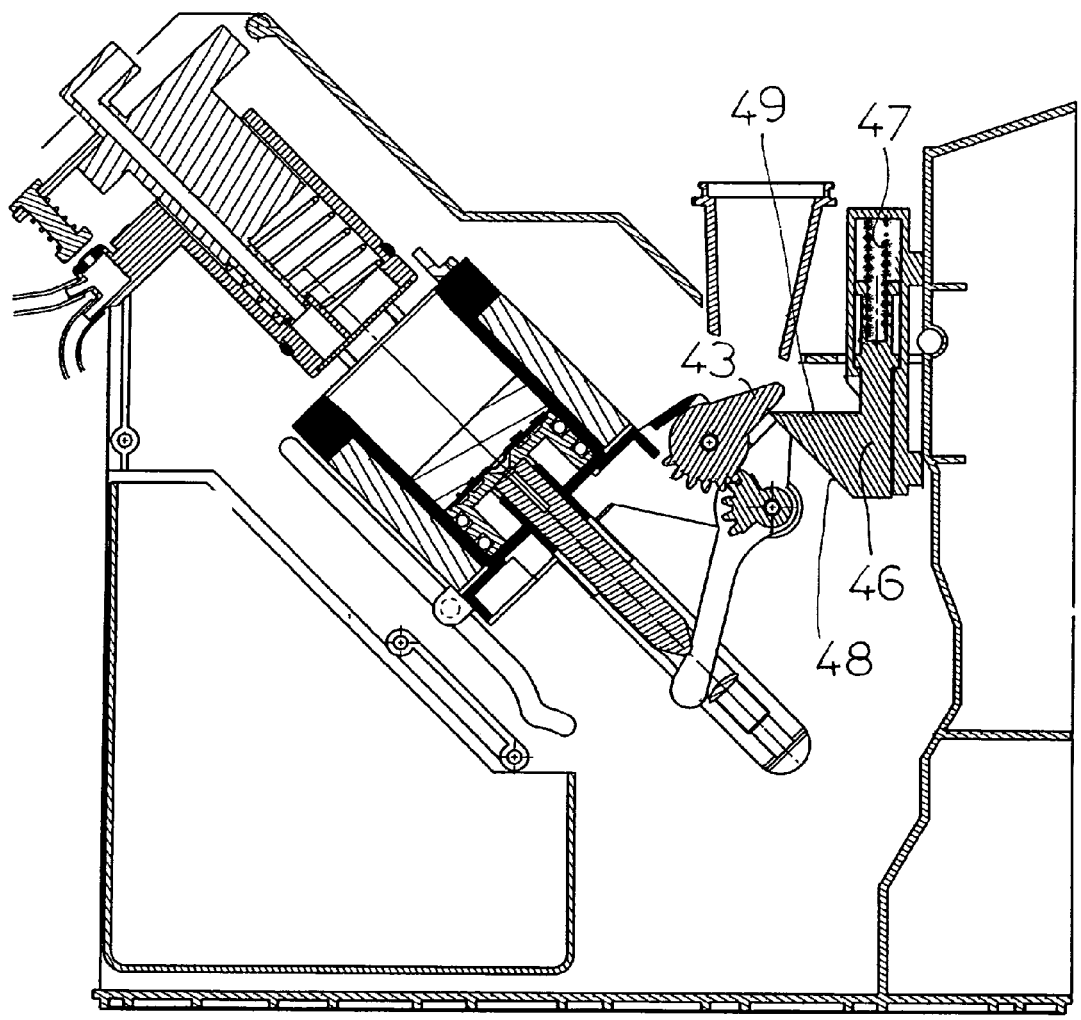
Figure 6:
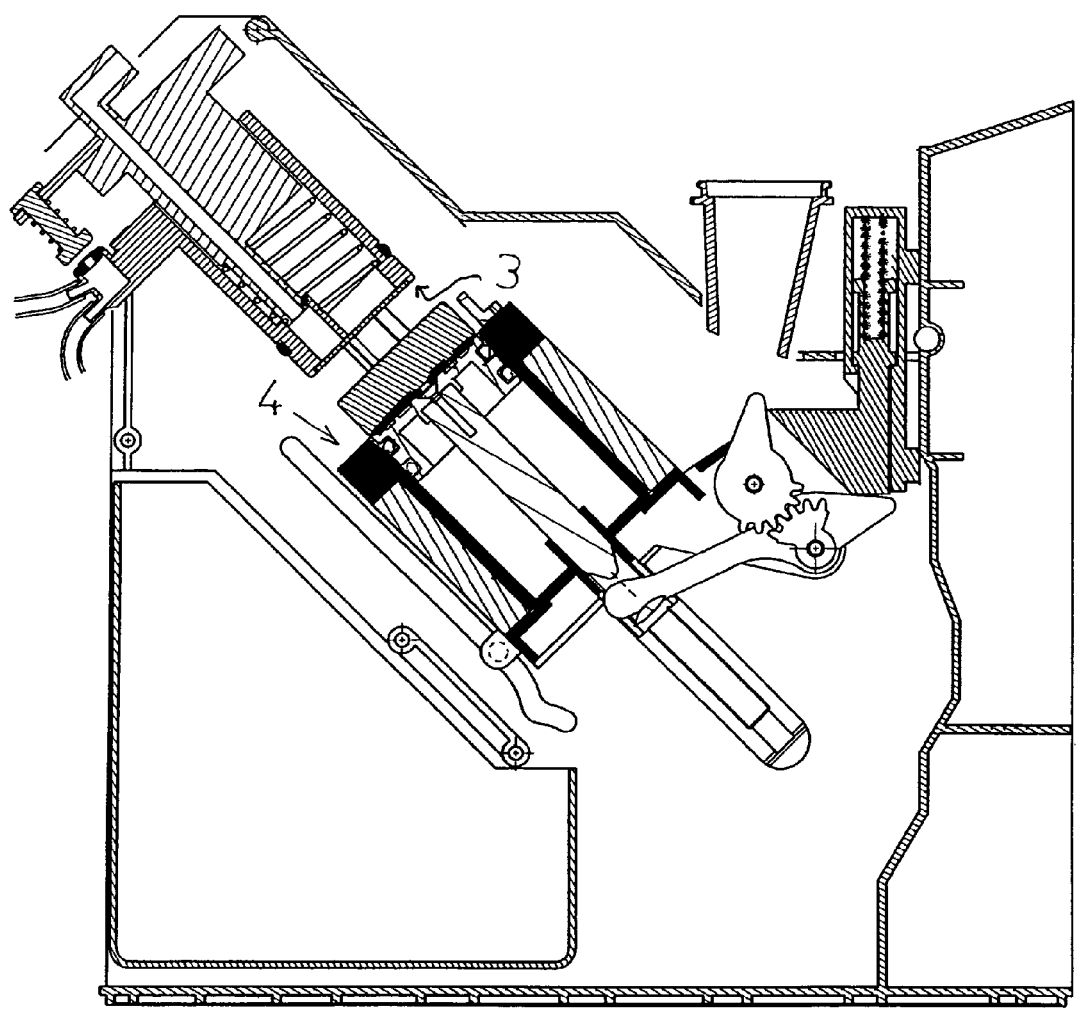
Figure 7:
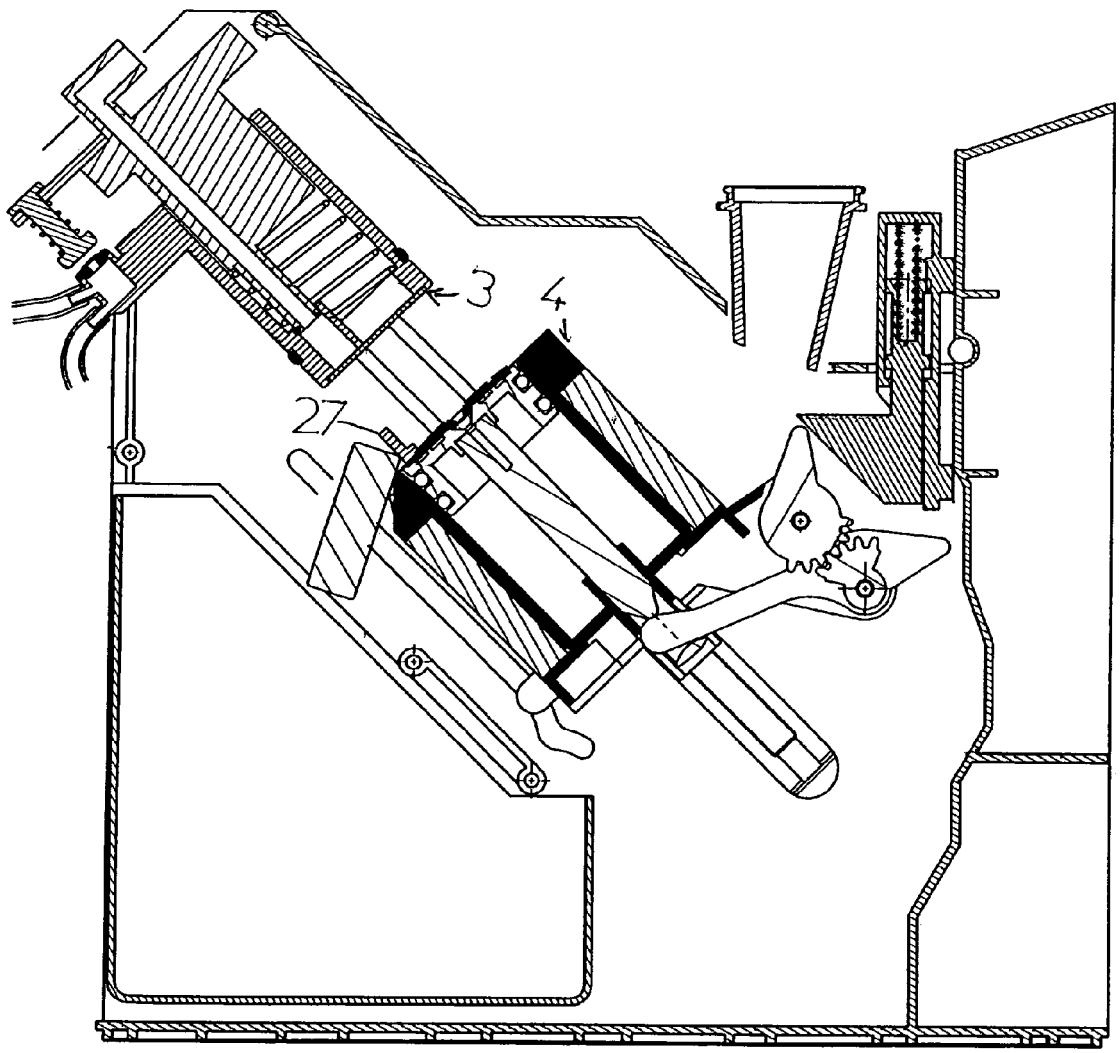
Figure 8:
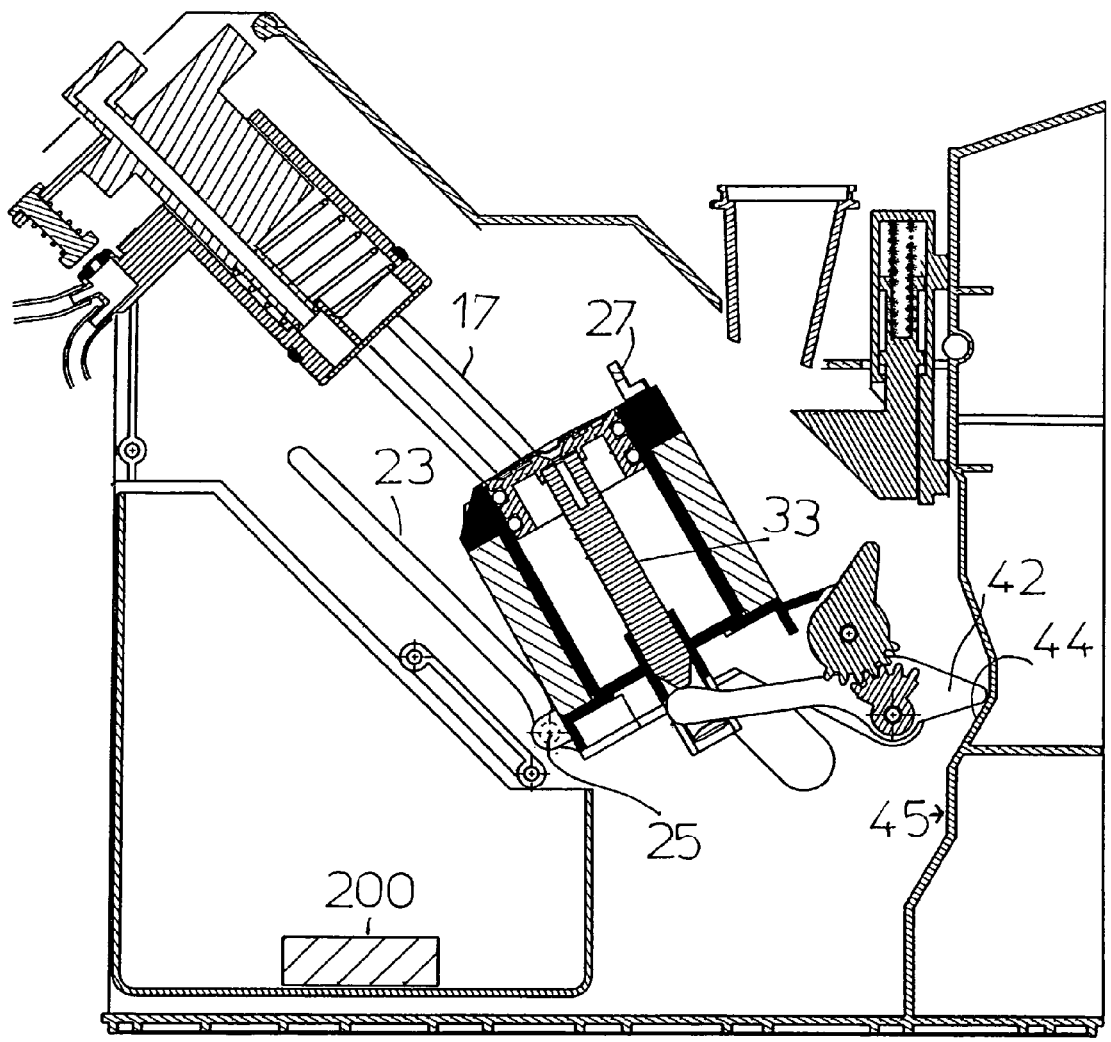
Figure 9:
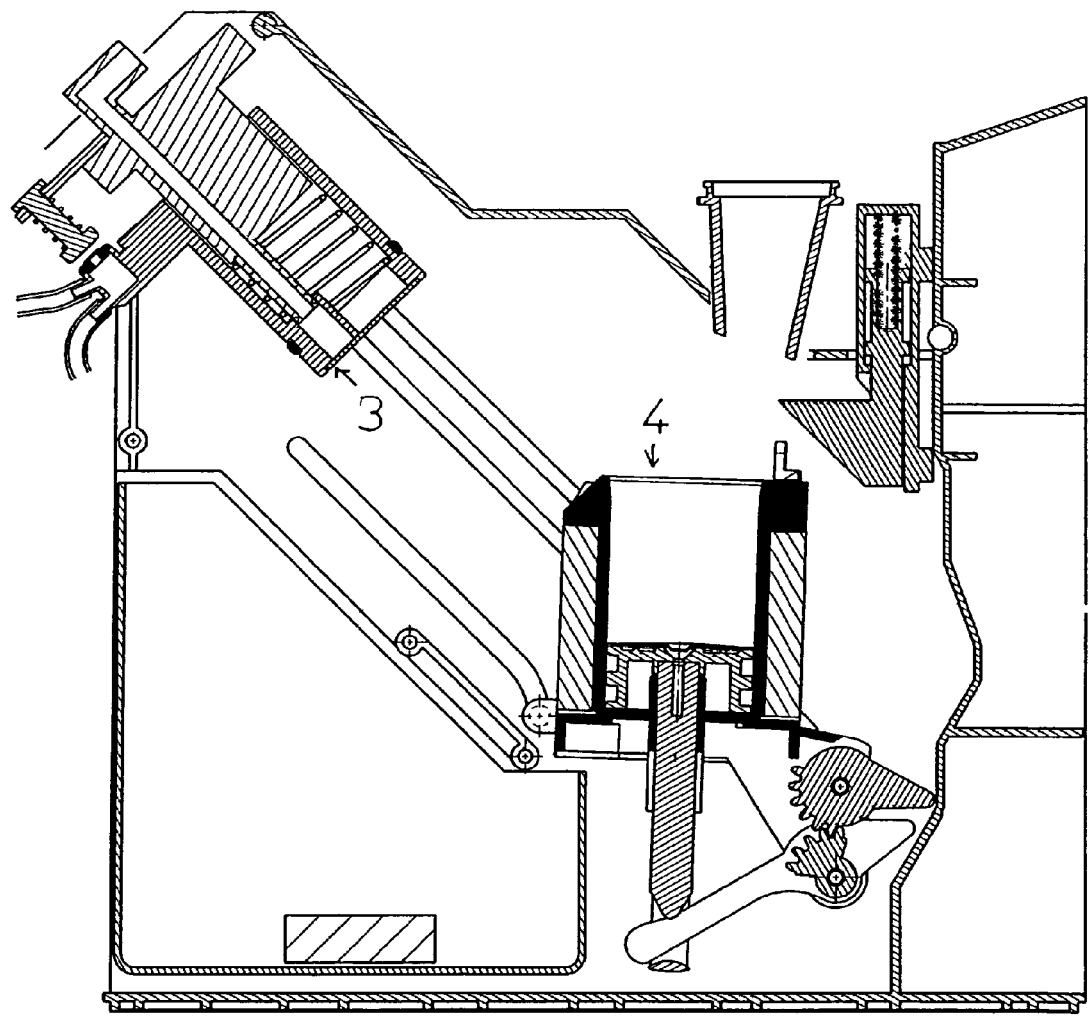

Equivalent parts in the figures are indicated by equivalent reference numbers.

With reference to the mentioned figures, a coffee machine is shown indicated in its entirety with the reference number 1.

The coffee machine 1 has an infusion group comprising a closure piston 3 and an infusion cylinder 4 subjectable to a reversible movement relative to the closure piston 3 between a position of engagement for the creation of an infusion chamber 5 and a position of disengagement for the loading of a coffee powder load 200.

The infusion group has also an expulsion system of the spent coffee powder load from the infusion cylinder 4.

The expulsion system comprises an expulsion piston 29 displaceably housed in the infusion cylinder 4, and further comprises a speed multiplier mechanism operatively connecting the infusion cylinder 4 and the expulsion piston 29 for their relative displacement between a receiving position of the fresh coffee powder load into the infusion cylinder and an expelling position of the spent coffee powder load from the infusion cylinder 4.

The speed multiplier mechanism is permanently fixed to the infusion cylinder 4 or (as shown) to a carrier 9 of the infusion cylinder 4 whereon the infusion cylinder 4 is preferably detachably mounted.

The expulsion system has cam actuating means for actuation of the speed multiplier mechanism.

The cam actuating means can actuate the speed multiplier mechanism during a translation component of the movement of the infusion cylinder 4 or during a rotation component of the movement of said infusion cylinder 4.

The infusion group has a main body formed by a shell 6 which defines a space for the reversible movement of the infusion cylinder 4, and supports a boiler (not shown) adapted to supply infusion water to the closure piston 3.

The carrier 9 has a rotation axis orthogonal to and movable along a translation axis 10 of the carrier 9 in turn parallel to the axis 13 of the closure piston 3. The axis 13 of the closure piston 3 is tilted with respect to the horizontal.

Suitable means are provided for the rotation of the carrier 9, between a first angular position in which the axis 12 of the infusion cylinder 4 is oriented transversely to the translation axis 10 to carry out the loading of said coffee powder load, and a second angular position in which the axis 12 of the infusion cylinder is oriented parallel to the translation axis 10. The rotation means of the carrier 9 comprise a cam 23 for the rotation of the carrier 9, in which a projection 25 is engaged which projects from the carrier 9 or from the infusion cylinder 4.

The expulsion system further comprises a scraper 27 pivoted at the side of the access mouth of the infusion cylinder 4 and movable in rotation in a coordinated manner with an expulsion piston 29.

The speed multiplier mechanism comprises a push rod 30 having a first end 31 operatively connected to the rod 33 of the expulsion piston 29 and a second end 34 pivoted in 35 to push rod 30 and having an arc of teeth 38 meshed with an arch of teeth 39 of a second transmission element 40 pivoted in 41 to a support 205 integrally fixed to the carrier 9 or to the infusion cylinder 4.

The speed multiplier mechanism further comprises a pick-up cam 42 of the retraction movement of the expulsion piston 29, shaped on the second end 34 of the push rod 30, and a pick-up cam 43 of the extraction movement of the expulsion piston 29, shaped on the second transmission element 40.

The hinging axes 35 and 41 are parallel to each other and preferably orthogonal to the axis 12 of the infusion cylinder 4.

The pick-up cams are preferably of flat form and are positioned and moved on respective parallel planes, spaced so to not mutually interfere.

The cam actuating means operate pick-up cam 42 and pick-up cam 43.

As to pick-up cam 42, the cam actuating means comprise an interception element 44 made by a suitable shaping of a internal side wall 45 of the shell 6.

As to pick-up cam 43, the cam actuating means comprise a ratchet 46 constrained to the side wall 45 of the shell 6.

The ratchet 46 can oscillate along a short translation path against and driven by a spring 47 and has a slide surface 48 and an interception surface 49 tilted with respect to each other.

Furthermore also the scraper 27 can have its own cam actuating means of type analogous to that described for the speed multiplier mechanism, for instance a ratchet adapted to interfere with a suitable cam which projects from the scraper 27 to drive in rotation the latter so to sweep the access mouth of the infusion cylinder 4 at which the expulsion piston 29 has brought the load of spent coffee powder. The scraper 27 more in particular has a hinging pin parallel to the axis 12 of the infusion cylinder 4 and is moved against and driven by a return spring (not shown) towards the rest position at the side of the access mouth to the infusion cylinder 4.

The functioning of the coffee machine 1 is briefly as follows.

The infusion cylinder 4 is found at travel start below the loader of the coffee powder and preferably with axis slightly tilted back with respected to the vertical.

The expulsion piston 29 is in retracted position.

At the end of the loading of the coffee powder in the infusion cylinder 4 the latter is moved.

During the initial part of ascent, the projection follows a curvilinear section of the rotation cam 23 which causes the rotation of the infusion cylinder 4 until the axis 12 of the infusion cylinder 4 is aligned with the axis 13 of the closure piston 3.

Such rotation of the infusion cylinder 4 also generates a certain levelling of the coffee powder just poured into the infusion cylinder 4.

From this moment, the upward driving proceeds with the same angular orientation of the infusion cylinder 4, since the remaining section of the rotation cam 23 is rectilinear and parallel to the translation axis 10 of the infusion cylinder 4.

During the ascent of the infusion cylinder 4, the pick-up cam 43 of the expulsion piston 29 extraction movement encounters the slide surface 48 of the ratchet 46, which moves back and is passed over by the cam 43 which is thus not driven in movement.

The same thing occurs for the pick-up cam of the rotation movement of the scraper 27, which is not driven in movement.

The infusion cylinder 4 comes to be engaged with the closure piston 3 and the infusion occurs.

At the end of the infusion, the descent movement begins of the infusion cylinder 4.

During descent, the infusion cylinder 4 is disengaged from the closure piston 3 and the speed multiplier mechanism is activated.

The speed multiplier mechanism operates in the following manner.

The pick-up cam 43 of the expulsion piston 29 extraction movement this time encounters the interception surface 49 of the ratchet 46, which cannot move backward and is passed over by the cam which however is driven in movement. The movement of the cam 43 is transmitted to the push rod 30 and from this to the expulsion piston 29 through the gear between the first and second transmission 37 and 40. The expulsion piston 29 is moved towards the access mouth of the infusion cylinder 4.

Analogously, the pick-up cam 121 of the scraper 27 rotation movement this time encounters the interception surface of the related ratchet, which cannot move backward and is passed over by the cam, which is however driven in movement. The coordinated movement of the expulsion piston 29 and scraper 27 determines the expulsion of the spent coffee powder load 200 which is connected in a suitable collector 201.

The scraper 27 automatically returns in the initial rest position due to the return spring while the retraction of the expulsion piston 29 is controlled during the final descent section of the infusion cylinder 4 when the pick-up cam 42 of the retraction movement of the expulsion piston 29 encounters the interception element 44 which causes a rotation of the gear between the first and second transmission element 37 and 40, equal in amplitude but in opposite sense with respect to that which previously occurred during the extraction of the expulsion piston 29.

After the expulsion of the spent coffee powder load, during a further terminal descent section of the infusion cylinder 4, the projection 25 once again follows the curvilinear section of the rotation cam 23, which causes the counter-rotation of the infusion cylinder 4 until its axis 12 is aligned with the overlying loader.

Figure 10:
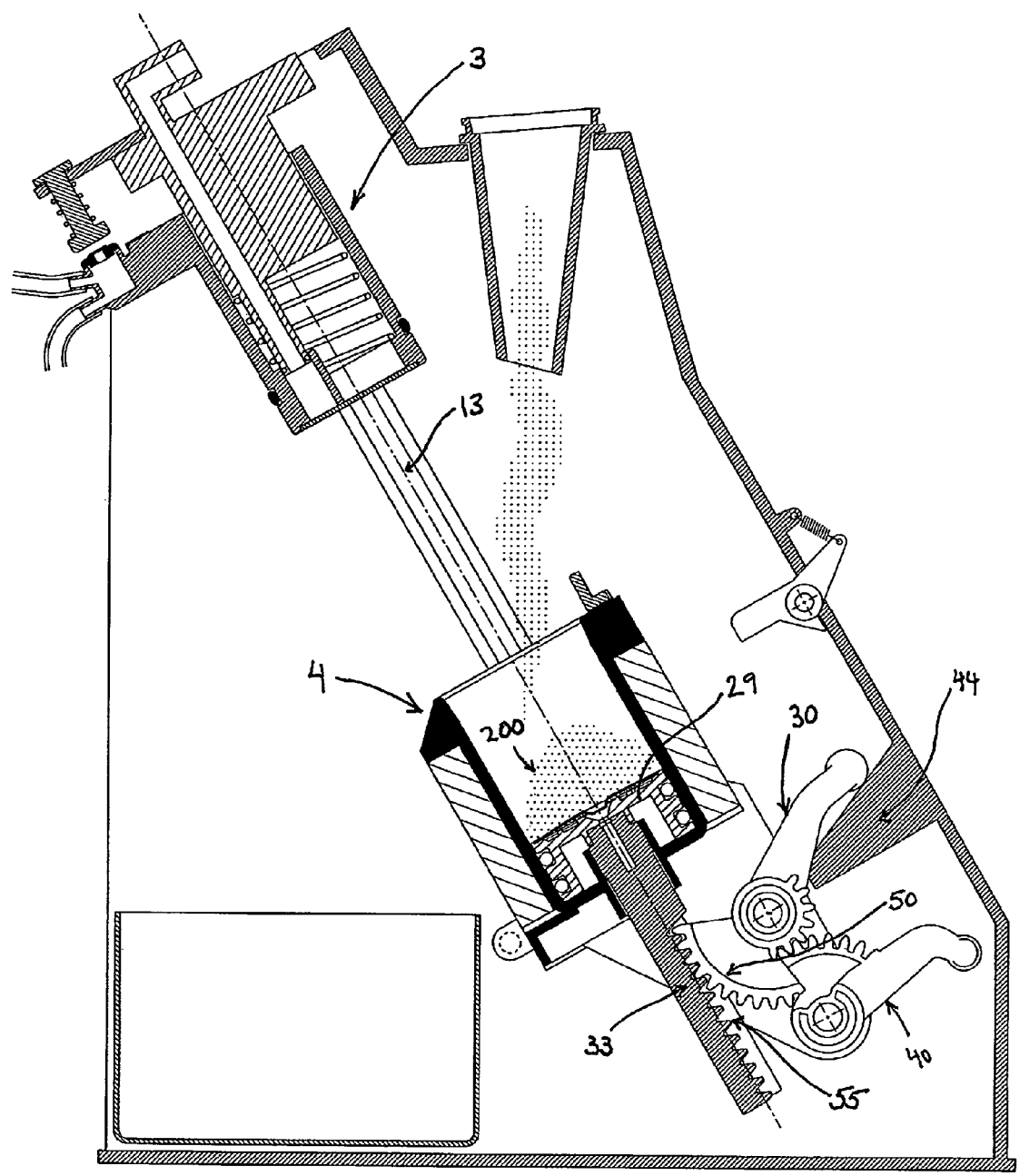
FIGS. 10-18 show a side elevation of a section in a central vertical plane of a coffee machine having an infusion group according to a second embodiment of the present invention, wherein the infusion cylinder is shown in the operative positions which progressively follow each other in an entire functioning cycle.
Figure 11:
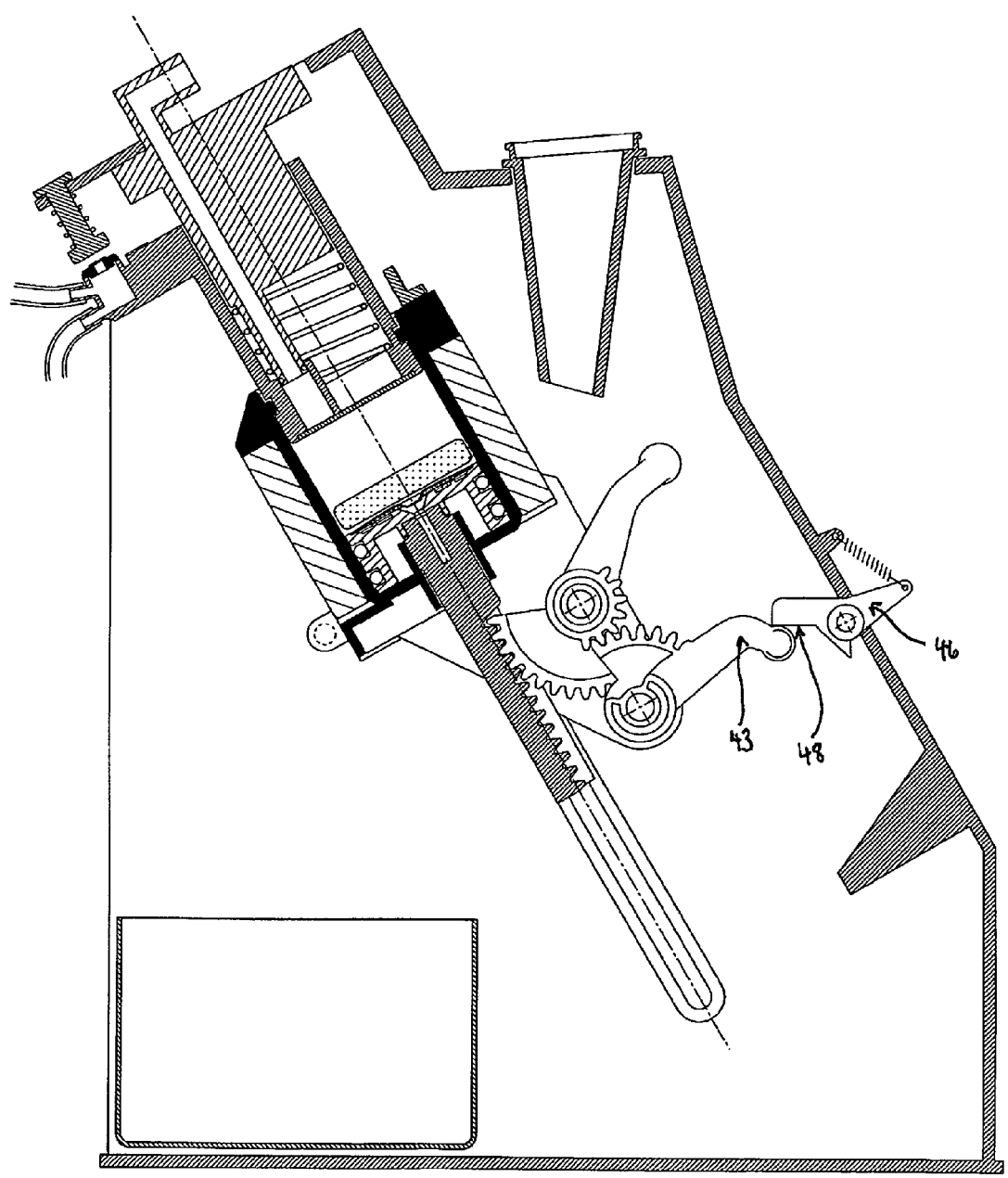
Figure 12:
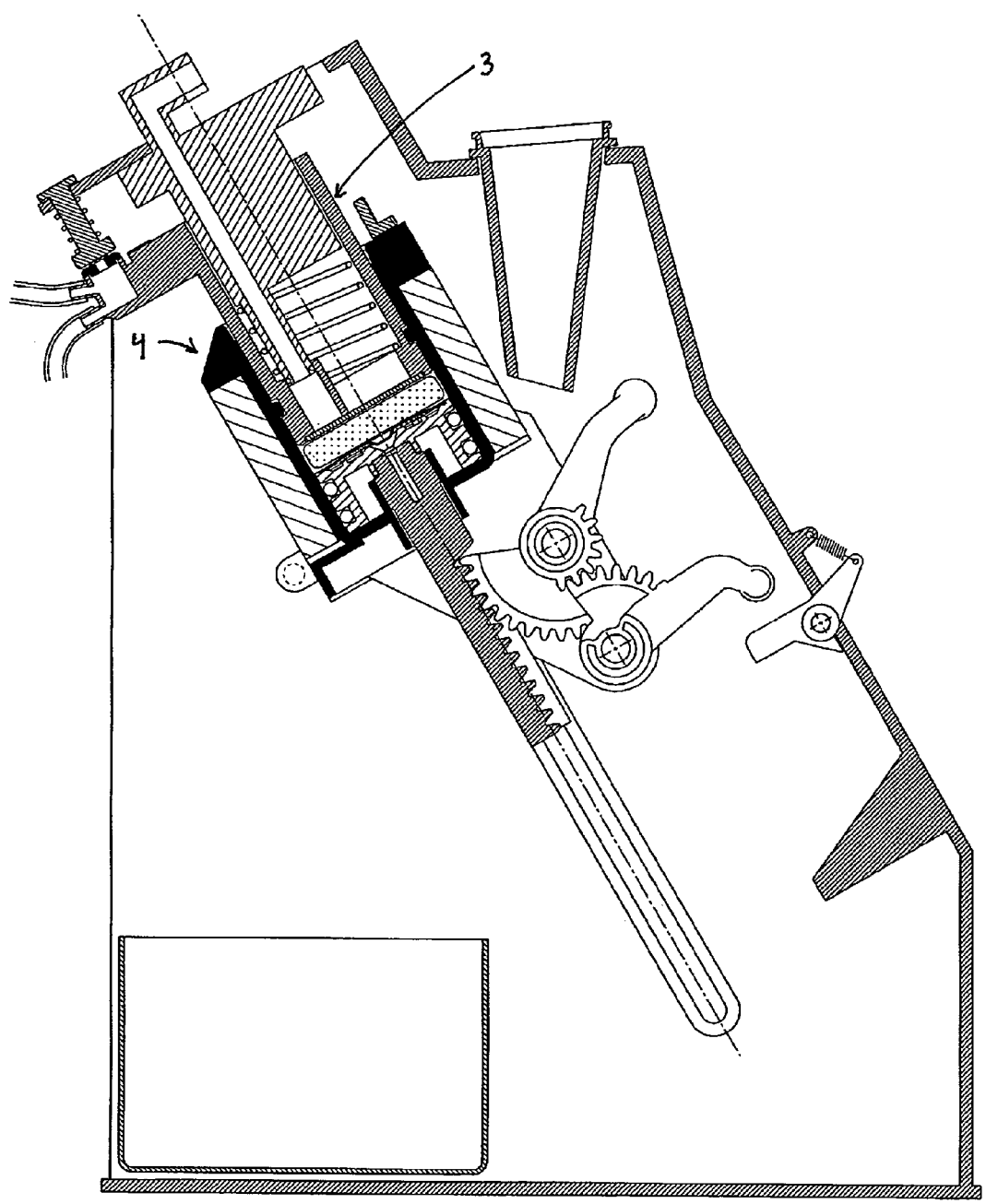
Figure 13:
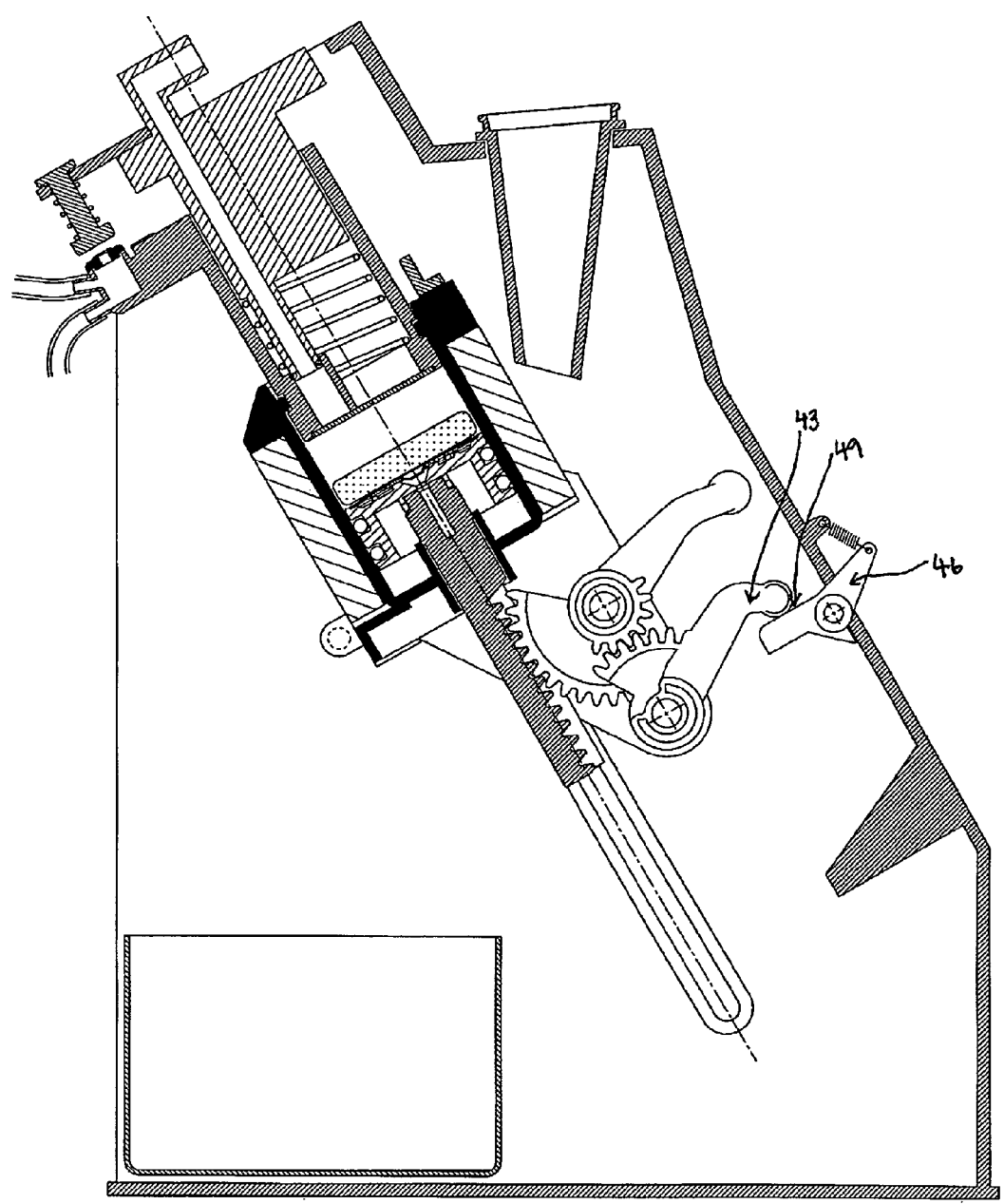
Figure 14:
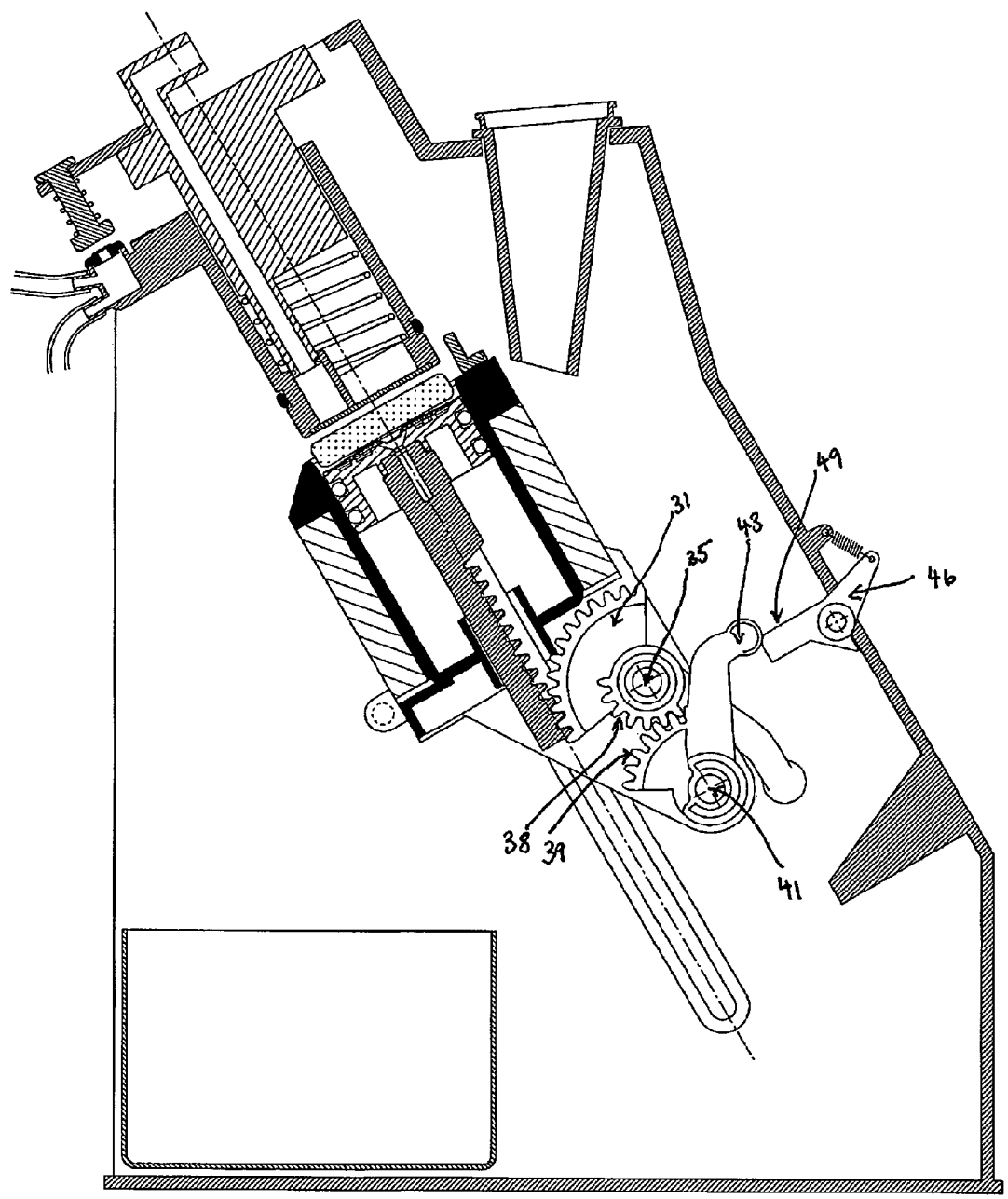
Figure 15:
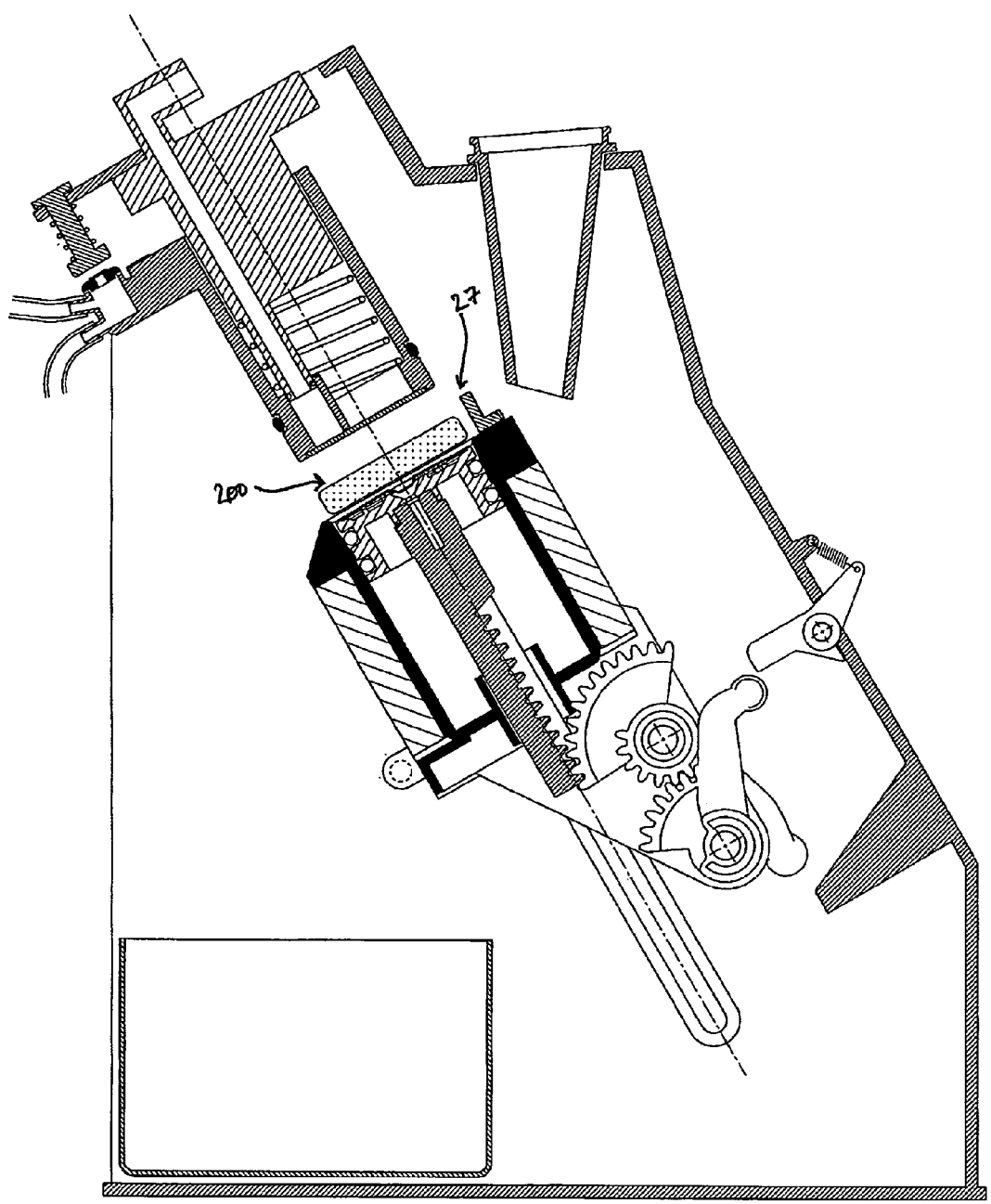
Figure 16:
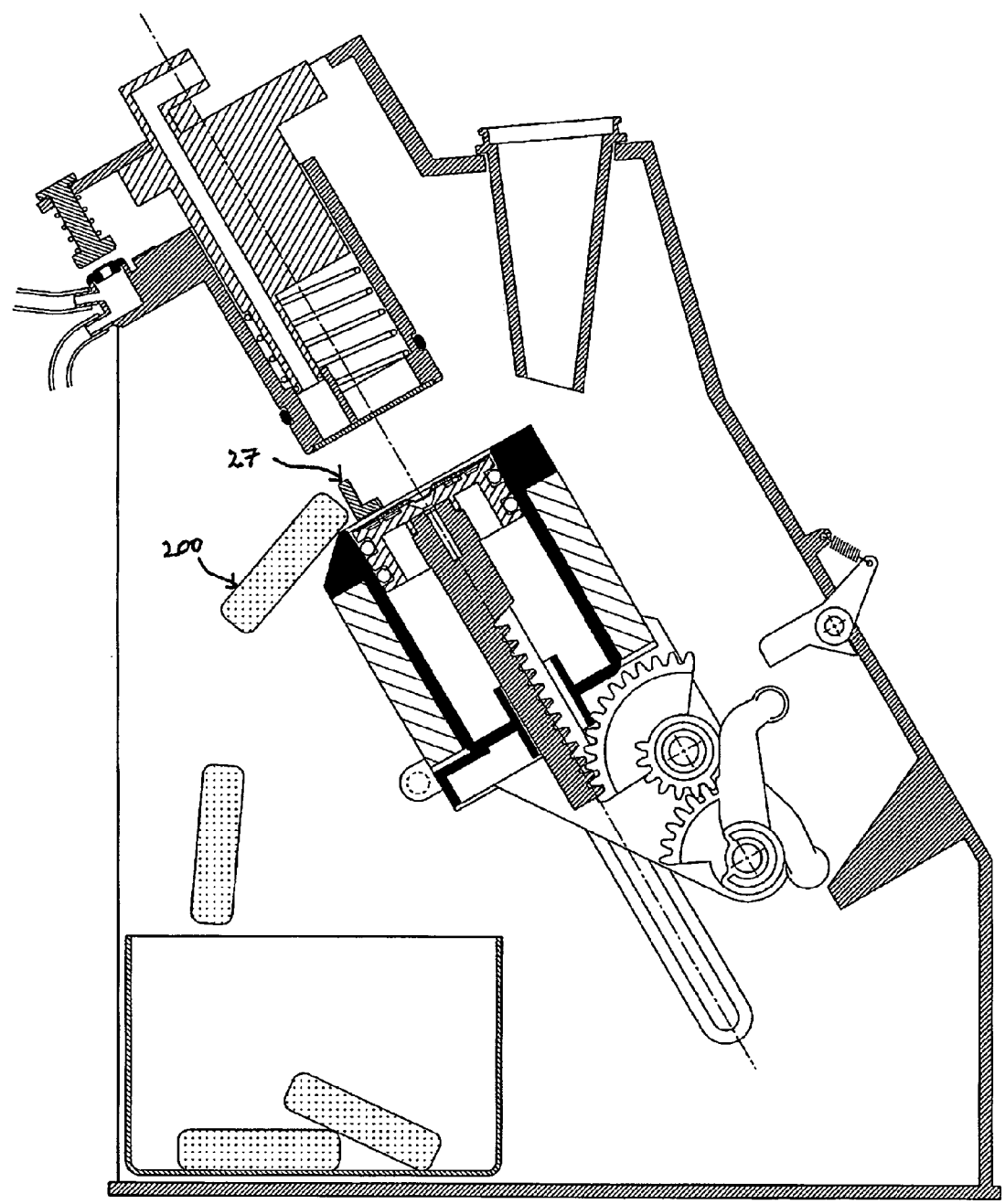
Figure 17:
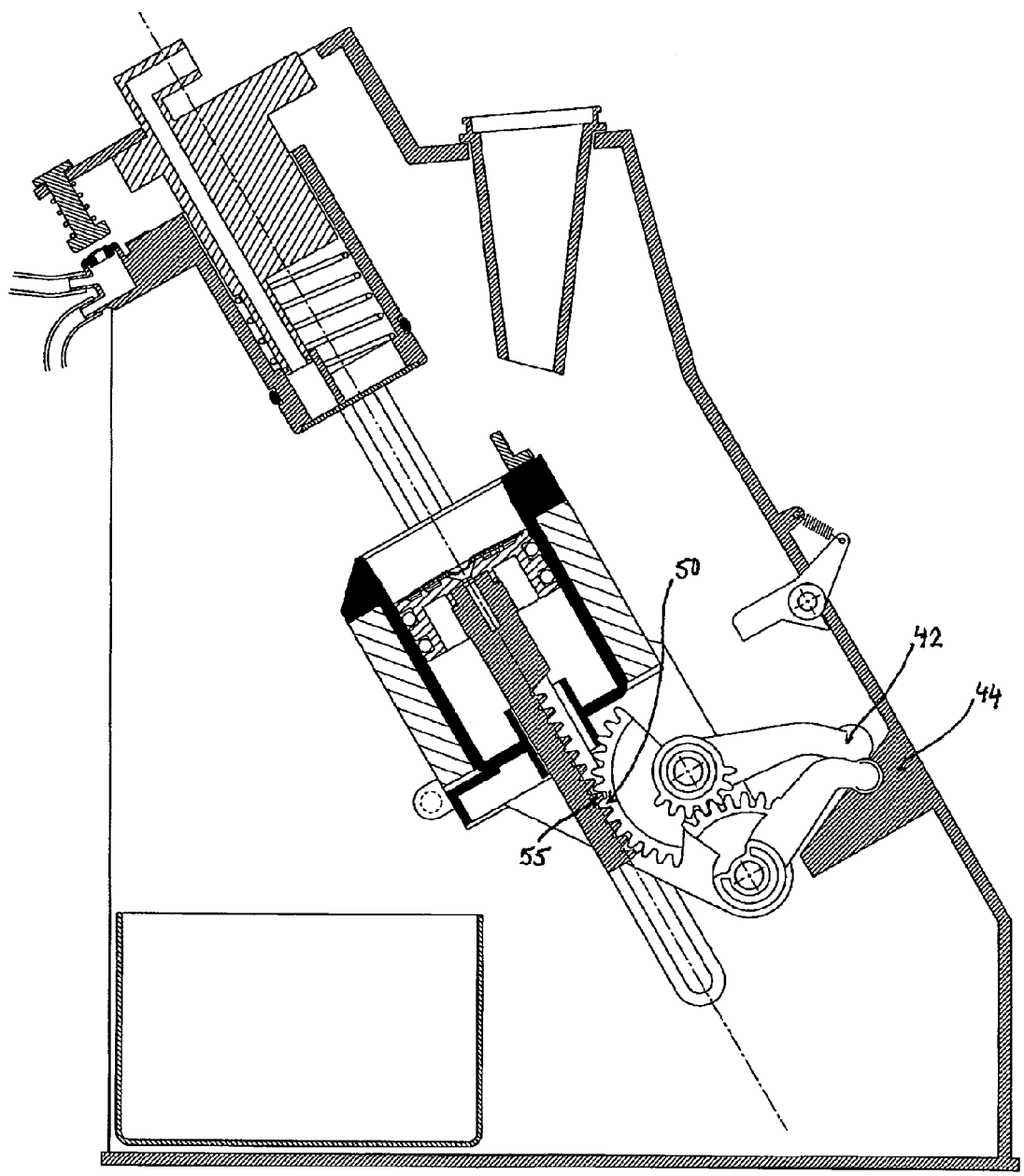
Figure 18:
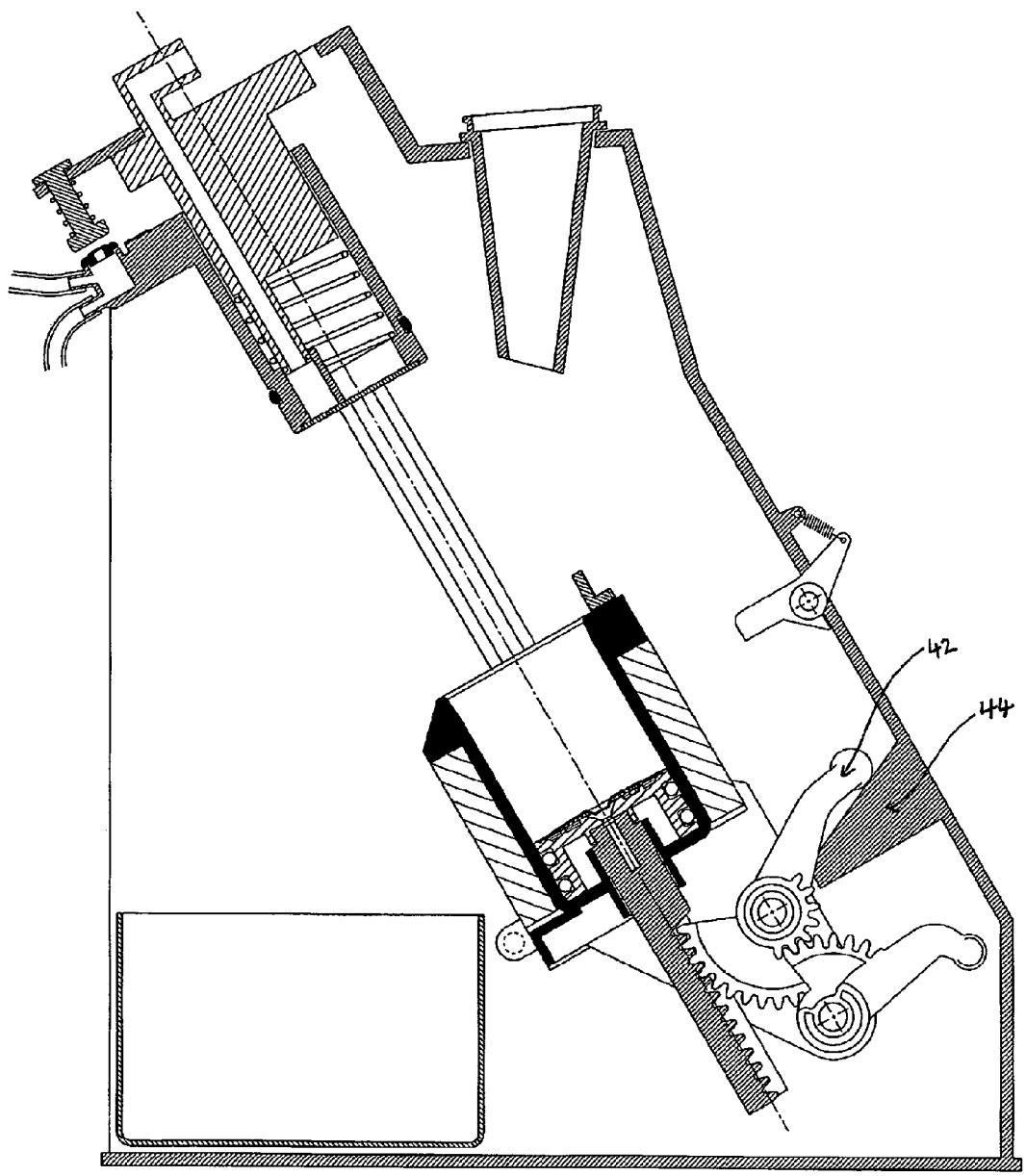

With reference to FIGS. 10-18, in a second embodiment of the invention the infusion cylinder 4 is fixedly aligned with the axis 13 of the closure piston 3. It thus exhibits only a linear translational movement. In this second embodiment, the push rod 30 is connected to the rod 33 of the expulsion piston 29 by an arc of teeth 50 meshing with a rack of teeth 51 along the rod 33. Apart from this difference in the speed multiplier mechanism and the lack of roto-translational movement of the infusion cylinder 4, the structure and operation of the speed multiplier mechanism operatively connecting the infusion cylinder 4 and the expulsion piston 29 for their relative displacement are as described above.

The coffee machine thus conceived is susceptible of many modifications and variations, all of which fall within the scope of the inventive concept; moreover all details can be replaced by technically equivalent elements.

The infusion group according to the present invention can be installed in any type of coffee machine, and in particular both for coffee machines providing a mere translation, and for coffee machines providing a roto-translation of the infusion cylinder.

In practice, the materials used, as well as dimensions, can be of any type according to the particular requirements and the state of the art.

The invention claimed is:

1. Coffee machine infusion group comprising a closure piston and an infusion cylinder subjectable to a reversible movement between a position of engagement with said closure piston for the creation of an infusion chamber and a position of disengagement from said closure piston for the loading of a coffee powder load, said infusion group having an expulsion system of the spent coffee powder load from said infusion cylinder, said expulsion system having an expulsion piston displaceably housed in said infusion cylinder and a speed multiplier mechanism operatively connecting said infusion cylinder and said expulsion piston for their relative displacement between a receiving position of said coffee powder load into said infusion cylinder and an expelling position of said coffee powder load from said infusion cylinder, said speed multiplier mechanism comprises a push rod having a first end operatively connected to a rod of said expulsion piston and a second end pivoted to a support integrally fixed to said infusion cylinder or to said carrier, a first transmission element integral with said push rod and having an arc of teeth meshing with an arc of teeth of a second transmission element pivoted to said support.

2. Coffee machine infusion group according to claim 1, wherein said speed multiplier mechanism is permanently fixed to said infusion cylinder or to a carrier of said infusion cylinder whereon said infusion cylinder is detachably mounted.

3. Coffee machine infusion group according to claim 1, wherein said expulsion system has cam actuating means for actuation of said speed multiplier mechanism.

4. Coffee machine infusion group according to claim 1, wherein said cam actuating means actuate said speed multiplier mechanism during a translation component of the movement of said infusion cylinder.

5. Coffee machine infusion group according to claim 3, wherein said cam actuating means actuate said speed multiplier mechanism during a rotation component of the movement of said infusion cylinder.

6. Coffee machine infusion group according to claim 1, wherein said speed multiplier mechanism further comprises a pick-up cam of the retraction movement of the expulsion piston, obtained from the second end of said push rod, and a pick-up cam of the extraction movement of said expulsion piston, obtained from said second transmission element.

7. Coffee machine infusion group according to claim 1, wherein said first end of said push rod is housed in a hole of said rod of said expulsion piston.

8. Coffee machine infusion group according to claim 1, wherein said first end of said push rod comprises an arc of teeth meshing with a rack of teeth along said rod of said expulsion piston.

9. Coffee machine infusion group according to claim 6, wherein said cam actuating means for actuating said pick-up cam of the retraction movement of the expulsion piston comprise an interception element made by a suitable shaping of a internal side wall of a shell of said infusion group which defines a space for the reversible movement of said infusion cylinder.

10. Coffee machine infusion group according to claim 6, wherein said cam actuating means for actuating said pick-up cam of the extraction movement of the expulsion piston comprise a ratchet constrained to said side wall of said shell.

11. Coffee machine infusion group according to claim 10, wherein said ratchet can oscillate along a short translation path against and driven by a spring and has a slide surface and an interception surface, tilted with respect to each other, for said pick-up cam of the extraction movement of the expulsion piston.

12. Coffee machine infusion group according to claim 1, in combination with a coffee machine.

\* \* \* \* \*